United States Patent
Tedja et al.

(10) Patent No.: US 8,773,799 B1
(45) Date of Patent: Jul. 8, 2014

(54) SIGNAL PROCESSING CIRCUITRY WITH FRONTEND AND BACKEND CIRCUITRY CONTROLLED BY SEPARATE CLOCKS

(71) Applicant: LSI Corporation, Milpitas, CA (US)

(72) Inventors: Suharli Tedja, San Ramon, CA (US); Shaohua Yang, San Jose, CA (US); Fan Zhang, Milpitas, CA (US); Qi Zuo, Milpitas, CA (US); Joseph Garofalo, Shanghai (CN); Yu Kou, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/724,946

(22) Filed: Dec. 21, 2012

(51) Int. Cl.
*G11B 5/09* (2006.01)

(52) U.S. Cl.
USPC .......................................................... 360/51

(58) Field of Classification Search
CPC ................................................ G11B 20/10231
See application file for complete search history.

(56) References Cited

U.S. PATENT DOCUMENTS

| | | | |
|---|---|---|---|
| 5,121,262 A | 6/1992 | Squires et al. | |
| 5,471,350 A * | 11/1995 | Lokhoff | 360/48 |
| 5,544,138 A * | 8/1996 | Bajorek et al. | 369/53.42 |
| 6,052,244 A * | 4/2000 | Haraguchi et al. | 360/46 |
| 6,122,131 A | 9/2000 | Jeppson | |
| 6,278,568 B1 | 8/2001 | Cloke et al. | |
| 6,816,328 B2 | 11/2004 | Rae | |
| RE38,703 E * | 2/2005 | Stan et al. | 360/73.03 |
| 2009/0150746 A1 | 6/2009 | Chaichanavong et al. | |

* cited by examiner

*Primary Examiner* — Daniell L Negron
(74) *Attorney, Agent, or Firm* — Ryan, Mason & Lewis, LLP

(57) ABSTRACT

An apparatus comprises read channel circuitry and associated signal processing circuitry comprising frontend processing circuitry and backend processing circuitry. The frontend processing circuitry comprises a loop detector and equalizer configured to determine an equalized read channel signal from a read channel signal and a decoding module configured to apply verification and scrambling processing on a decoded read channel signal. The backend processing circuitry comprises a backend detector, an interleaver, a backend decoder, and a de-interleaver configured to perform an iterative decoding process on the equalized read channel signal to determine the decoded read channel signal. The frontend processing circuitry is controlled by a first clock having an associated first clock rate and the backend processing circuitry is controlled by a selected one of the first clock and a second clock having an associated second clock rate determined at least in part by the first clock rate and a maximum clock rate.

20 Claims, 4 Drawing Sheets

SIGNAL PROCESSING CIRCUITRY WITH FRONTEND AND BACKEND CIRCUITRY CONTROLLED BY SEPARATE CLOCKS

FIELD

The field relates to signal processing, and, more particularly, to processing of digital data signals.

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

SUMMARY

In one embodiment, an apparatus comprises read channel circuitry and signal processing circuitry associated with the read channel circuitry. The signal processing circuitry comprises frontend processing circuitry and backend processing circuitry. The frontend processing circuitry comprises a loop detector and equalizer configured to determine an equalized read channel signal from a read channel signal and a decoding module configured to apply verification and scrambling processing on a decoded read channel signal. The backend processing circuitry comprises a backend detector, an interleaver, a backend decoder, and a de-interleaver, the backend processing circuitry being configured to perform an iterative decoding process on the equalized read channel signal to determine the decoded read channel signal. The frontend processing circuitry is controlled by a first clock having an associated first clock rate and the backend processing circuitry is controlled by a selected one of the first clock and a second clock having an associated second clock rate, the second clock rate being determined at least in part by the first clock rate and a maximum clock rate.

Other embodiments of the invention include, by way of example and without limitation, methods, storage devices, virtual storage systems, integrated circuits and computer-readable storage media having computer program code embodied therein.

DETAILED DESCRIPTION

Embodiments of the invention will be illustrated herein in conjunction with exemplary disk-based storage devices, read channel circuitry and associated signal processing circuitry for processing read channel data signals. For example, embodiments of the invention include HDDs or other types of storage devices that exhibit enhanced peak power control using decoupled clock rates for portions of the signal processing circuitry. It should be understood, however, that these and other embodiments of the invention are more generally applicable to any storage device in which improved signal processing and peak power control is desired. Additional embodiments may be implemented using components other than those specifically shown and described in conjunction with the illustrative embodiments.

The following acronyms are utilized in this description:

| | |
|---|---|
| CRC | Cyclic Redundancy Check |
| HDD | Hard Disk Drive |
| LDPC | Low-Density Parity-Check |
| MAP | Maximum a Posteriori Probability |
| NRZ | Non Return to Zero |
| RAID | Redundant Array of Independent Storage Devices |
| RLL | Run Length Limited |
| RPM | Revolutions Per Minute |
| RS | Reed Solomon |
| SOVA | Soft-output Viterbi Algorithm |

Figure 1:
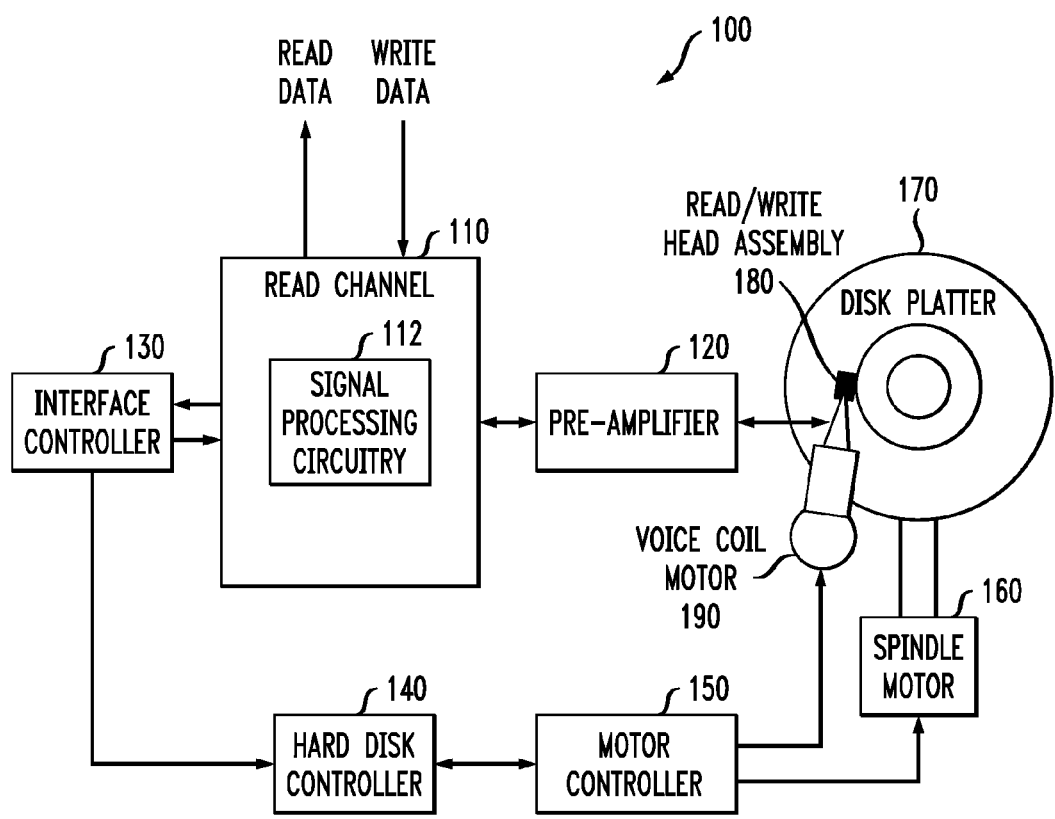
FIG. 1 shows a disk-based storage device, according to an embodiment of the invention.

FIG. 1 shows a disk-based storage device 100 including read channel circuitry 110 having signal processing circuitry 112 in accordance with various embodiments of the invention. Although shown in FIG. 1 as being incorporated within read channel circuitry 110, the signal processing circuitry 112 may also be implemented at least in part externally to the read channel circuitry 110. Storage device 100 may be, for example, a hard disk drive. Storage device 100 also includes a preamplifier 120, an interface controller 130, a hard disk controller 140, a motor controller 150, a spindle motor 160, a disk platter 170, read/write head assembly 180, and voice coil motor 190. Interface controller 130 controls addressing and time of data to and from disk platter 170. In some embodiments, disk platter 170 includes magnetic signals recorded in accordance with either a longitudinal or a perpendicular recording scheme.

Read/write head assembly 180 is positioned by voice coil motor 190 over a desired data track on disk platter 170. Motor controller 150 controls the voice coil motor 190. Motor controller 150 controls the voice coil motor 190 to position read/write head assembly 180 in relation to disk platter 170 and drives spindle motor 160 by moving read/write head assembly 180 to the proper data track on disk platter 170 under direction of hard disk controller 140. Spindle motor 160 spins disk platter 170 at a determined spin rate (RPMs).

Once read/write head assembly 180 is positioned adjacent the proper data track, magnetic signals representing data on disk platter 170 are sensed by read/write head assembly 180 as disk platter 170 is rotated by spindle motor 160. The sensed magnetic signals are provided as an analog signal representative of the magnetic data on disk platter 170. This analog signal is transferred from read/write head assembly 180 to read channel circuitry 110 via preamplifier 120. Preamplifier 120 is operable to amplify the analog signals accessed from disk platter 170. In turn, read channel circuitry 110 decodes and digitizes the received analog signal to recreate the information originally written to disk platter 170. This data is provided as read data.

Various elements of the storage device 100 may be implemented at least in part within a processing device. A processing device includes a processor and a memory, and may be implemented at least in part within an associated host computer or server in which the storage device 100 is installed. Portions of the processing device may be viewed as comprising "control circuitry" as that term is broadly defined herein.

It is important to note that storage device 100 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

In order to improve peak power control of storage device 100, the read channel circuitry 110 incorporates signal processing circuitry 112.

Figure 2:
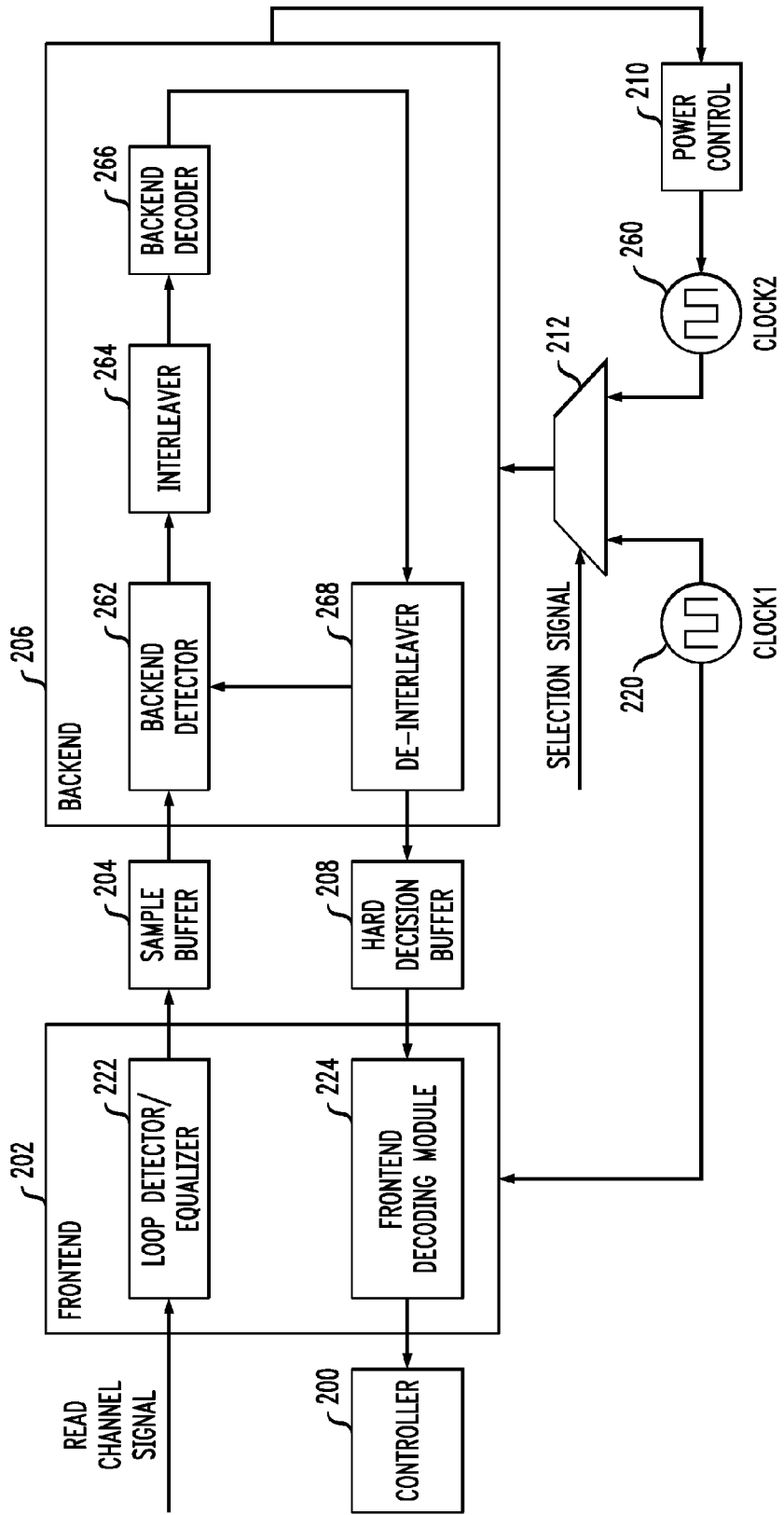
FIG. 2 is a detailed view of portions of the signal processing circuitry of FIG. 1, according to an embodiment of the invention.

FIG. 2 illustrates an embodiment of signal processing circuitry 112. A read channel data signal is received by element 222. In some embodiments, the read channel data signal is a digital data signal received from an analog-to-digital converter. In the FIG. 2 embodiment, the element 222 comprises a loop detector and an equalizer. The equalizer receives and equalizes the digital data signal, while the loop detector is configured to determine soft decision and hard decision information of the equalized digital data signal. The equalized digital data signal may comprise a number of samples referred to herein as y samples, and the hard decision information may comprise a set of hard decisions and reliability indicators for each of the set of hard decisions. The loop detector may be a soft-output Viterbi algorithm (SOVA) detector, a maximum a posteriori probability (MAP) detector, or some combination of SOVA, MAP and other detector types.

The equalized digital data signal is stored in a sample buffer 204, and passed to a backend detector 262. The backend detector 262 is configured to determine soft decision and hard decision information of the equalized digital data signal. The backend detector 262 may be a SOYA detector, a MAP detector, or some combination of SOYA, MAP and other detector types. The hard decision and soft decision information is input to an interleaver 264, which may be used to overcome correlated channel noise such as burst errors. An output of the interleaver 264 is input to backend decoder 266. The backend decoder 266 is configured to decode the equalized digital data signal using the hard decision and soft decision information. The backend decoder 266 may be a low-density parity-check (LDPC) decoder, a Reed Solomon (RS) decoder, or some combination of LDPC, RS and other decoder types. The backend decoder 266 may be configured to perform a number of local iterations to determine the decoded data signal.

The decoded data signal is input into de-interleaver 268, which reverses the processing performed by the interleaver 264 to align the decoded data signal. An output of the de-interleaver 268 is coupled to an input of the backend detector 262 so that a number of global iterations including the backend detector 262, interleaver 264, backend decoder 266 and de-interleaver 268 can be performed on a given equalized digital data signal. The decoded digital data signal, which may comprise a set of hard decisions or non-return to zero (NRZ) data for each of the samples in the equalized digital data signal, is stored in hard decision buffer 208.

A decoding module 224 performs various processing on the decoded digital data signal stored in the hard decision buffer 208. Such processing may include applying cyclic redundancy checks (CRCs), run length limited (RLL) coding and scrambling on the decoded digital data signal. An output of the decoding module 224 is input to a controller 200 which interfaces with other portions of the read channel circuitry 110.

The decoding module 224 and element 222 collectively form a portion 202 of the signal processing circuitry 112. This portion 202 is also referred to herein as frontend processing circuitry, which is coupled to a first clock source 220. The backend detector 262, interleaver 264, backend decoder 266 and de-interleaver collectively form another portion 206 of the signal processing circuitry 112. The portion 206 is also referred to herein as backend processing circuitry. The backend processing circuitry 206 is coupled to a multiplexer 212. The multiplexer 212 receives inputs from the first clock source 220 and a second clock source 260. The second clock source 260 is also coupled to a power control module 210. The multiplexer 212 further receives a selection signal to select between the first clock source 220 and the second clock source 260.

Each of the first clock source 220 and the second clock source 260 has a respective associated clock rate. Accordingly, embodiments of the invention may thus have frontend processing circuitry 202 which performs processing at the clock rate associated with the first clock source 220 and backend processing circuitry 206 with performs processing at the clock rate output from the multiplexer 212.

The clock rate output from the multiplexer 212 will determine a number of global iterations performed by the backend processing circuitry 206. A number of local iterations performed in the backend decoder 266 will be performed for each of the global iterations. A number of global iterations and local iterations are typically chosen to ensure continuous throughput in the signal processing circuitry 112.

Depending on a portion of the disk platter 170 from which the read channel signal is read, the peak and average power requirement for processing in the frontend processing circuitry will vary. The clock rate associated with the first clock source 220 is determined based on the design of the storage device 100. Outer-diameter zones of the disk platter 170 require the highest clock rate in the first clock source 220. Outer-diameter zones of the disk platter 170 typically have lower-density storage compared to middle and inner diameter zones of the disk platter 170. Low density storage conditions rely less on global iterations including the backend decoder 266 for error recovery. Due to the clock requirements in the design of the storage device 100 at outer-diameter zones of the disk platter 170, high power cells are required to meet timing constraints.

Middle-diameter and inner-diameter zones of the disk platter 170 have higher storage density than outer-diameter zones of the disk platter 170. The required number of global iterations needed for read channel signals read from middle-diameter and inner-diameter zones of the disk platter 170 are normally higher than that of outer-diameter zones due to the higher channel bit density at middle-diameter and inner-diameter zones. Power concerns for read channel signals read from the middle-diameter and inner-diameter zones of the disk platter 170 are not as constrained as that of read channel signals read from outer-diameter zones of the disk platter 170. As such, embodiments of the invention decouple the clock rate at which processing is performed in the frontend processing circuitry 202 and backend processing circuitry 206.

The frontend processing circuitry 202 and backend processing circuitry 206 can thus run at different clock rates. The clock rate associated with the first clock source 220 is determined by the design of the storage device 100, and is fixed for various zones of the disk platter 170. The clock rate associated with the first clock source 220 can thus be one of a number of discrete clock rates for fixed zones, such as inner, middle and outer-diameter zones of the disk platter 170. In other embodiments, the clock rate associated with the first clock source 220 may be substantially continuously programmed based in part by a function of the diameter of the disk platter 170 from which the read channel signal is read.

The clock rate associated with the second clock source 260 can be faster than that of the clock rate associated with the first clock source 220. For example, for read channel signals read from inner-diameter and middle-diameter zones of the disk platter 170, the clock rate associated with the second clock source 260 can be higher than that associated with the first clock source 220. The clock rate associated with second clock source 260, however, will be capped to a maximum frequency that the backend processing circuitry 206 is designed for.

In some embodiments, the clock rate associated with the second clock source 260 is maintained within a range of the clock rate associated with the first clock source 220. For example, the clock rate associated with the second clock source 260 may be maintained within a range of about 70%-130% of the clock rate associated with the first clock source 220. The maximum clock rate associated with the second clock source 260 may be alternatively or further capped to some percentage of the maximum clock rate associated with the first clock source 220. For example, in one embodiment the maximum clock rate associated with the second clock source 260 is capped to about 90% of the maximum clock rate associated with the first clock source 220. Embodiments of the invention, however, are not limited to maintaining the second clock source 260 within the range of 70%-130% or to capping the maximum clock rate associated with the second clock source 260 to 90% of the maximum clock rate. Instead, embodiments may tailor these percentages for a given storage disk arrangement as desired.

When the backend clock rate input to the backend processing circuitry 206 is faster than that of the clock rate associated with the first clock source 220, each detection and decoding time unit measures less compared to the frontend reference time unit and thus the backend processing circuitry 206 can process a sector "longer" than the frontend processing circuitry 202. Thus, the backend processing circuitry 206 supports more iteration throughput. When the backend clock rate input to the backend processing circuitry 206 is slower than that of the clock rate associated with the first clock source 220, each detection and decoding time unit measures more compared to the frontend reference time unit and thus supports fewer iteration throughput.

In some embodiments, the clock rate associated with the second clock source 260 is user-programmable via a clock rate control module. The clock rate control module may have an override based at least in part on the maximum clock rate. The clock rate associated with the second clock source 260 may be one of a number of discrete levels corresponding to a given density or range of densities of data stored on the disk platter 170 of the storage, device 100. In other embodiments, the clock rate associated with the second clock source 260 may be substantially continuously programmable. The maximum clock rate for the second clock source 260 may be predetermined and static in some embodiments.

The maximum clock rate, however, may alternatively be determined as a function of a level of power supplied to the backend processing circuitry 206 as determined by power control module 210. The power control module 210 may comprise a thermal sensor, where the maximum clock rate is further or alternatively a function of a thermal level or temperature determined by the thermal sensor. The temperature determined by the thermal sensor may be used as a reference for the control logic used to adjust the second clock source 260. If the temperature is above a specified threshold, the second clock source 260 may be set to a first frequency, or some ratio of the clock rate associated with the first clock source 220. If the temperature is at or below the specified threshold, the second clock source 260 may be set to a second frequency, or some ratio of the clock rate associated with the second clock source 260.

In other embodiments, the clock rate associated with the second clock source 260 is not user-programmable but is instead automatically adjusted based on the circuit current level. The power control module 210 may monitor a circuit utilization of the read channel 110, the signal processing circuitry 112, the frontend processing circuitry 202, the backend processing circuitry 206, or the storage disk 100 as a whole. The second clock source 260 may be controlled based at least in part on how much of the circuit is being utilized, or how much of the whole chip is running or idle. If the idle circuit percentage is above a specified threshold, the clock rate associated with the second clock source 260 is increased. If the busy circuit percentage is above another specified threshold, the clock rate associated with the second clock source 260 is decreased. In this manner, the chip can be programmed so as to avoid an instantaneous peak current limit or requirement of the storage disk 100, read channel 110, the signal processing circuitry 112, the frontend processing circuitry 202, and/or the backend processing circuitry 206.

In still other embodiments, the power control module 210 may control the second clock source 260 based on a combination of the thermal sensor level, the circuit current level, a user-programmed frequency level, and the clock rate associated with first clock source 220. It is also important to note that although the power control module 210 is shown in FIG. 2 as coupled to the second clock source 260, in other embodiments the power control module 210 may instead provide the selection signal to multiplexer 212 or a clock rate control module which inputs the backend clock rate which controls the backend processing circuitry 206.

Multiplexer 212 is configured to receive information regarding associated clock rates from first clock source 220 and second clock source 260. This allows embodiments of the invention to monitor the clock rate associated with the first clock source 220. If the user programs the backend clock rate to an over-design-limit level, the multiplexer will cap or saturate the clock rate input to the backend processing circuitry 206 to the maximum allowed frequency to protect the integrity of the backend processing circuitry 206. The backend clock rate input to the backend processing circuitry 206 may be capped to a clock rate at or below the maximum clock rate when the user-programmed clock rate exceeds the maximum clock rate for second clock source 260.

It is important to note that while FIG. 2 shows a multiplexer 212 which monitors and inputs the backend clock rate to the backend processing circuitry 206, embodiments of the invention are not limited solely to use with multiplexers. For example, element 212 need not be a physical multiplexer. Instead, the multiplexer 212 may be replaced in some embodiments with other circuitry or elements to monitor and control the backend clock rate for the backend processing circuitry 206. As an example, a clock rate control module may be used in place of the multiplexer 212. The clock rate control module may control the backend clock rate input to the backend processing circuitry 206 by using the clock rate associated with clock source 260 independently, by some combination of the clock rates associated with clock source 220 and clock source 260, or as some ratio of the clock rate associated with clock source 220. One skilled in the art will readily appreciate that various other arrangements are possible for controlling the backend clock rate input to the backend processing circuitry 206.

Figure 3:
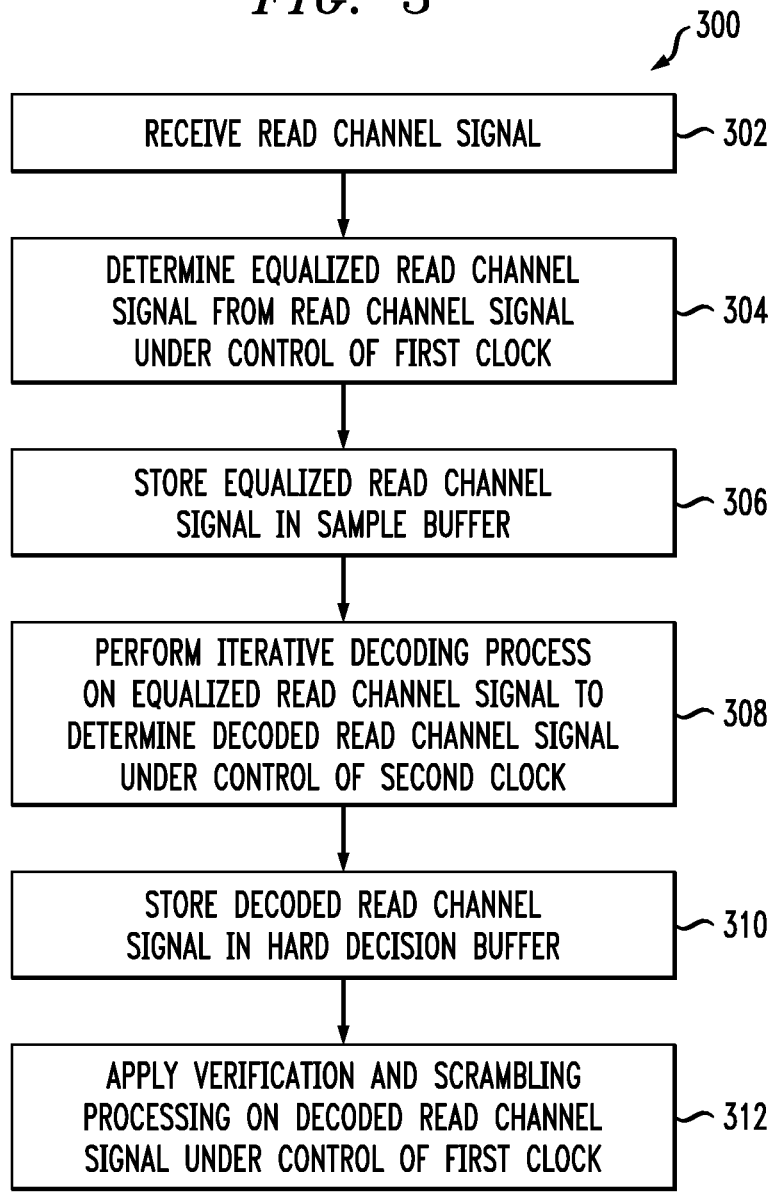
FIG. 3 illustrates a methodology of signal processing, according to an embodiment of the invention.

FIG. 3 illustrates a methodology 300 of signal processing in an embodiment of the invention. The methodology beings with receiving 302 a read channel signal. Next, an equalized read channel signal is determined 304 from the read channel signal. The rate of processing in step 304 is controlled by a first clock. The equalized read channel signal is stored in step 306. Next, an iterative decoding process is performed 308 on the equalized read channel signal to determine a decoded read channel signal. The rate of processing in step 304 is controlled by a second clock. In step 310, the decoded read channel signal is stored. Finally, verification and scrambling processing is applied 312 to the decoded read channel signal. The rate of processing in step 312 is controlled by the first clock.

As mentioned previously, the storage device configuration can be varied in other embodiments of the invention. For example, the storage device may comprise a hybrid HDD which includes a flash memory in addition to one or more storage disks.

In addition, storage device 100 may be coupled to or incorporated within a host processing device, which may be a computer, server, communication device, etc.

Multiple storage devices 100-1 through 100-N possibly of various different types may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent storage Devices. The RAID system more specifically comprises N distinct storage devices denoted 100-1, 100-2, . . . 100-N, one or more of which may be HDDs and one or more of which may be solid state drives. Furthermore, one or more of the HDDs of the RAID system are assumed to be configured to include read channel circuitry and associated signal processing circuitry as disclosed herein. These and other virtual storage systems comprising HDDs or other storage devices are considered embodiments of the invention.

Embodiments of the invention may also be implemented in the form of integrated circuits. In a given such integrated circuit implementation, identical die are typically formed in a repeated pattern on a surface of a semiconductor wafer. Each die includes, for example, at least a portion of signal processing circuitry 112 as described herein, and may further include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

It should again be emphasized that the above-described embodiments of the invention are intended to be illustrative only. For example, other embodiments can use different types and arrangements of storage disks, read/write heads, read channel circuitry, signal processing circuitry, decoders, filters, detectors, and other storage device elements for implementing the described signal processing functionality. Also, the particular manner in which certain steps are performed in the signal processing may vary. Further, although embodiments of the invention have been described with respect to storage disks such as HDDs, embodiments of the invention may be implemented various other devices including optical data-storage applications and wireless communications. These and numerous other alternative embodiments within the scope of the following claims will be apparent to those skilled in the art.

What is claimed is:

1. An apparatus, comprising:
    read channel circuitry; and
    signal processing circuitry associated with the read channel circuitry, the signal processing circuitry comprising:
    frontend processing circuitry comprising a loop detector and equalizer configured to determine an equalized read channel signal from a read channel signal and a decoding module configured to apply verification and scrambling processing on a decoded read channel signal;
    backend processing circuitry comprising a backend detector, an interleaver, a backend decoder, and a de-interleaver, the backend processing circuitry being configured to perform an iterative decoding process on the equalized read channel signal to determine the decoded read channel signal;
    wherein the frontend processing circuitry is controlled by a first clock having an associated first clock rate and wherein the backend processing circuitry is controlled by a selected one of the first clock and a second clock having an associated second clock rate, the second clock rate being determined at least in part by the first clock rate and a maximum clock rate.

2. The apparatus of claim 1, wherein the read channel signal is received from a storage device comprising at least one disk platter, wherein the at least one disk platter has an inner diameter zone, a middle diameter zone and an outer diameter zone, the first clock being a function of a given one of the inner diameter zone, middle diameter zone and outer diameter zone from which the read channel signal is received.

3. The apparatus of claim 2, wherein for a read channel signal read from the inner diameter zone, the first clock rate is lower than the second clock rate and wherein for a read channel signal read from the outer diameter, the second clock rate is lower than the first clock rate.

4. The apparatus of claim 1, further comprising a clock rate control module for controlling the second clock, the clock rate control module being user programmable with an override based at least in part on the maximum clock rate.

5. The apparatus of claim 1, wherein the second clock rate is one of a number of discrete levels, each of the number of discrete levels corresponding to a given density or range of densities of data stored on a disk platter of a storage device.

6. The apparatus of claim 1, wherein the second clock rate is substantially continuously programmable.

7. The apparatus of claim 1, wherein the maximum clock rate is predetermined and static.

8. The apparatus of claim 1, further comprising a power control module, wherein the maximum clock rate is a function of a level of power supplied to the backend processing circuitry as determined by the power control module.

9. The apparatus of claim 1, further comprising a thermal sensor, wherein the maximum clock rate is a function of a thermal level determined by the thermal sensor.

10. The apparatus of claim 1, wherein the signal processing circuitry further comprises a buffer coupled between the frontend processing circuitry and the backend processing circuitry, wherein:
    the equalizer is configured to equalize a read channel data signal to determine a set of equalized samples; and
    the buffer is configured to store the set of equalized samples;
    wherein the detector, interleaver, backend decoder and deinterleaver are configured to perform the iterative decoding process on the set of equalized samples, a number of iterations of the iterative decoding process being a function of the second clock rate.

11. The apparatus of claim 10, wherein the number of iterations of the iterative decoding process is lower for a read channel data signal read from an outer diameter zone of a given disk platter of the storage device and higher for a read channel data signal read from an inner diameter zone of the given disk platter of the storage device.

12. The apparatus of claim 1, wherein the signal processing circuitry further comprises a buffer coupled between the frontend processing circuitry and the backend processing circuitry, the buffer being configured to store a set of hard decisions determined by the backend processing circuitry and wherein the decoding module is operative to apply cyclic redundancy checks, run length limited coding, and scrambling on the set of hard decisions.

13. The apparatus of claim 1, further comprising a disk controller coupled to the read channel circuitry.

14. The apparatus of claim 1 wherein the read channel circuitry and associated signal processing circuitry are fabricated in at least one integrated circuit.

15. A storage device comprising the apparatus of claim 1.

16. A virtual storage system comprising the storage device of claim 15.

17. A method comprising the steps of:
determining an equalized read channel signal from a read channel signal;
performing an iterative decoding process on the equalized read channel signal to determine a decoded read channel signal;
applying verification and scrambling processing on the decoded read channel signal;
wherein the determining and applying steps are controlled by a first clock having an associated first clock rate and wherein the performing step is controlled by a second clock having an associated second clock rate, the second clock rate being determined at least in part by the first clock rate and a maximum clock rate.

18. The method of claim 17, wherein a number of iterations of the iterative decoding process is a function of the second clock rate.

19. The method of claim 17, wherein the read channel signal is received from a storage device comprising at least one disk platter, wherein the at least one disk platter has an inner diameter zone, a middle diameter zone and an outer diameter zone, the first clock rate being a function of a given one of the inner diameter zone, middle diameter zone and outer diameter zone from which the read channel signal is received.

20. A storage device comprising:
at least one storage medium;
a read head configured to read data from the storage medium; and
control circuitry coupled to the read head and configured to process data received from the read head;
the control circuitry comprising:
read channel circuitry; and
signal processing circuitry associated with the read channel circuitry, the signal processing circuitry comprising:
frontend processing circuitry comprising a loop detector and equalizer configured to determine an equalized read channel signal from a read channel signal and a decoding module configured to apply verification and scrambling processing on a decoded read channel signal;
backend processing circuitry comprising a backend detector, an interleaver, a backend decoder, and a de-interleaver, the backend processing circuitry being configured to perform an iterative decoding process on the equalized read channel signal to determine the decoded read channel signal;
wherein the frontend processing circuitry is controlled by a first clock having an associated first clock rate and wherein the backend processing circuitry is controlled by a selected one of the first clock and a second clock having an associated second clock rate, the second clock rate being determined at least in part by the first clock rate and a maximum clock rate.

* * * * *

UNITED STATES PATENT AND TRADEMARK OFFICE
CERTIFICATE OF CORRECTION

PATENT NO.       : 8,773,799 B1
APPLICATION NO.  : 13/724946
DATED            : July 8, 2014
INVENTOR(S)      : Suharli Tedja et al.

Page 1 of 1

It is certified that error appears in the above-identified patent and that said Letters Patent is hereby corrected as shown below:

In the Specification

Column 7, line 14, please change "304" to --308--

Figure 4:
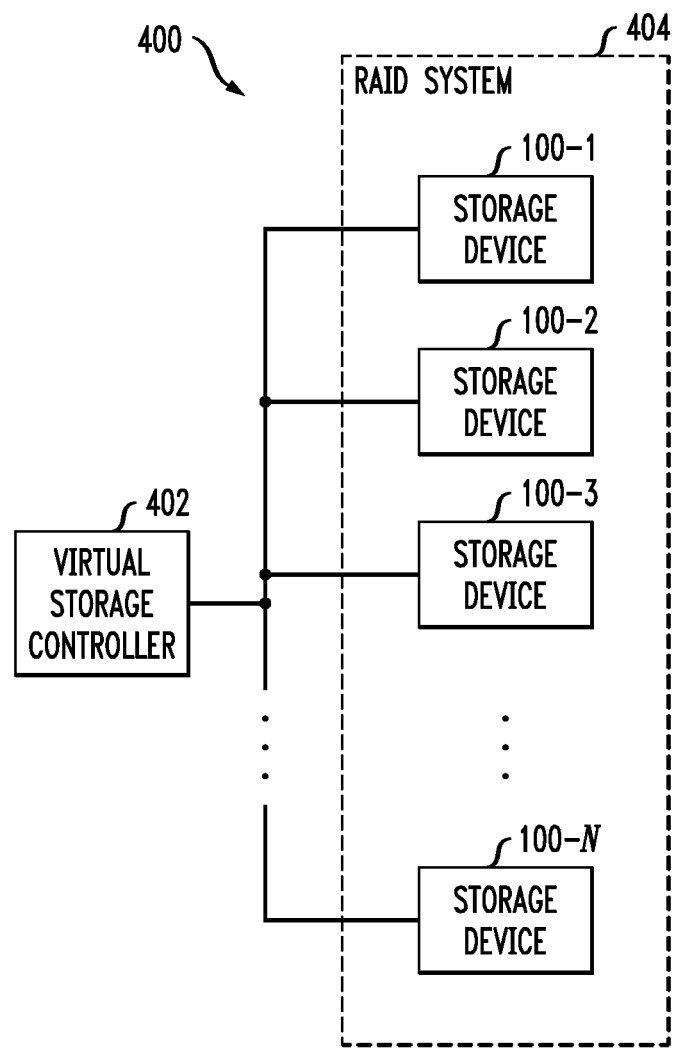
FIG. 4 shows a virtual storage system incorporating a plurality of disk-based storage devices of the type shown in FIG. 1, according to an embodiment of the invention.

Column 7, line 30, please change "700 as illustrated in FIG. 7." to --400 as illustrated in FIG. 4.--

Column 7, line 31, please change "700" to --400--

Column 7, line 32, please change "702" to --402--

Column 7, line 33, please change "704" to --404--

Signed and Sealed this
Seventh Day of October, 2014

Michelle K. Lee
*Deputy Director of the United States Patent and Trademark Office*